United States Patent
Nagata

(10) Patent No.: US 11,984,751 B2
(45) Date of Patent: May 14, 2024

(54) DISCHARGE CIRCUIT AND DISCHARGING METHOD OF MOTOR DRIVE POWER SUPPLY CIRCUIT, AND ROBOT CONTROLLER

(71) Applicant: NIDEC SANKYO CORPORATION, Nagano (JP)

(72) Inventor: Hiroaki Nagata, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 221 days.

(21) Appl. No.: 17/541,215

(22) Filed: Dec. 2, 2021

(65) Prior Publication Data

US 2022/0200317 A1  Jun. 23, 2022

(30) Foreign Application Priority Data

Dec. 17, 2020  (JP) ................................. 2020-209092

(51) Int. Cl.
| | | |
|---|---|---|
| *H02J 7/00* | (2006.01) | |
| *B25J 9/16* | (2006.01) | |
| *H02J 7/04* | (2006.01) | |

(52) U.S. Cl.
CPC ....... *H02J 7/007182* (2020.01); *B25J 9/1674* (2013.01); *H02J 7/0047* (2013.01); *H02J 7/0063* (2013.01); *H02J 7/0071* (2020.01); *H02J 7/04* (2013.01)

(58) Field of Classification Search
CPC .......... H02M 7/48; H02M 7/72; H02M 1/007; H02J 7/0071; H02P 27/06; H02P 3/18; H02P 7/63; B60L 3/0046; B60L 3/003; B60L 3/0084; B60L 3/0061; B60L 15/20; B60L 2240/421; B60L 2240/423; B25J 9/1674

See application file for complete search history.

(56) References Cited

U.S. PATENT DOCUMENTS

| | | | |
|---|---|---|---|
| 10,554,156 B2 * | 2/2020 | Xiang et al. | |
| 2014/0210389 A1 * | 7/2014 | Niwa et al. | |
| 2018/0222052 A1 * | 8/2018 | Vu et al. | |

FOREIGN PATENT DOCUMENTS

| | | |
|---|---|---|
| JP | H09121592 | 5/1997 |
| JP | H10243675 | 9/1998 |
| JP | H11262283 | 9/1999 |
| JP | 2004249534 | 9/2004 |

* cited by examiner

*Primary Examiner* — Said Bouziane
(74) *Attorney, Agent, or Firm* — JCIPRNET

(57) ABSTRACT

A discharge circuit for a power supply circuit for a motor is configured to discharge a capacitor provided in the power supply circuit. The discharge circuit includes a first voltage detector detecting a voltage inputted to a primary side of the power supply circuit, a second voltage detector detecting a voltage on the secondary side, and a discharge resistance provided in parallel with the power supply circuit on the secondary side of the power supply circuit. A power supply control means performs discharge control when a voltage detected by the second voltage detector exceeds a regenerative determination value and, in a case that a voltage on the primary side detected by the first voltage detector becomes lower than a power failure determination value, the power supply control means performs the discharge control after a lapse of a time period required for a stop operation of the industrial robot.

12 Claims, 2 Drawing Sheets

DISCHARGE CIRCUIT AND DISCHARGING METHOD OF MOTOR DRIVE POWER SUPPLY CIRCUIT, AND ROBOT CONTROLLER

CROSS REFERENCE TO RELATED APPLICATION

The present invention claims priority under 35 U.S.C. § 119 to Japanese Application No. 2020-209092 filed Dec. 17, 2020, the entire content of which is incorporated herein by reference.

FIELD OF THE INVENTION

At least an embodiment of the present invention may relate to a discharge circuit provided in a power supply circuit for motors structured to drive respective axes of an industrial robot, a discharging method of the power supply circuit, and a robot controller including the power supply circuit and the discharge circuit.

BACKGROUND

In equipment structured to drive and control a motor such as a synchronous motor or an induction motor by a servo driver, DC power which is obtained by rectifying and smoothing AC power from an external power supply such as a commercial AC power supply by using a rectifying circuit is supplied to the servo driver. In this configuration, a circuit including the rectifying circuit and a smoothing condenser (capacitor) provided at an output of the rectifying circuit is referred to as a power supply circuit. When control of decelerating a motor is performed, a regenerative current is supplied to a side of the power supply circuit from the motor through the servo driver. In a case that the regenerative current is supplied to the side of the power supply circuit, a DC voltage on a secondary side (output side) of the power supply circuit is increased and thereby, there may be a risk of exceeding a withstand voltage (in other words, allowable maximum input power supply voltage value) of equipment and an element connected with the power supply circuit. Therefore, in equipment which uses a motor, it is commonly structured so that a discharge resistance is provided on a secondary side of a power supply circuit and, when a power supply voltage value exceeds a predetermined value, a regenerative current is supplied to the discharge resistance to consume regenerative energy by the discharge resistance. Japanese Patent Laid-Open No. Hei 11-262283 (Patent Literature 1) discloses a circuit which is capable of braking a motor by consuming regenerative energy through a discharge resistance at a time of an emergency stop.

When supply of AC power to a primary side (input side) of a power supply circuit is cut off or, when an AC power supply is interrupted, electric charge having been accumulated remains to exist in a smoothing capacitor of a power supply circuit and thus, a DC voltage continues to be outputted. In this case, a DC voltage on a secondary side of a power supply circuit is required to make not more than a specified value within a predetermined time period for securing safety. Japanese Patent Laid-Open No. 2004-249534 (Patent Literature 2) discloses a control device which is structured so that, when supply of AC power to a power supply circuit is cut off by a contactor, an accumulated charge of a smoothing capacitor is forcibly discharged by using a discharge resistance for consuming regenerative energy. Japanese Patent Laid-Open No. Hei 9-121592 (Patent Literature 3) discloses a control device which is structured so that, when a power failure of an AC power supply is detected, an accumulated charge of a smoothing capacitor is forcibly discharged by using a discharge resistance for consuming regenerative energy. Japanese Patent Laid-Open No. Hei 10-243675 (Patent Literature 4) discloses a motor stop circuit which is structured so that, when a power failure of power supply is detected, a deceleration control command is outputted to an inverter which drives a motor and a regenerative discharge command is outputted to a regenerative discharge circuit having a discharge resistance.

In an industrial robot, a synchronous motor or an induction motor is commonly used as a motor for driving respective axes and the motor is driven and controlled by a servo driver having an inverter function. In a motor for an industrial robot, a regenerative current is also generated when deceleration control is performed and thus, it is structured that a discharge resistance for consuming regenerative energy is connected with a power supply circuit and a regenerative current is flowed through the discharge resistance according to a voltage on a secondary side of the power supply circuit. Further, in an industrial robot, on its safety standard, it is required so that, when power supply from an external power supply is cut off by an emergency stop of the robot or a power failure of an AC power supply, a voltage on a secondary side of the power supply circuit is set to be a predetermined voltage value (for example, 43V) or less within a predetermined time period (for example, one minute). When an emergency stop of a robot is to be performed, cut-off of an AC power supply is commonly performed on a primary side of the power supply circuit by a relay or a contactor. In order to set a voltage on a secondary side of the power supply circuit to be a predetermined voltage value within a predetermined time period, it is conceivable that the techniques described in Patent Literatures 2 through 4 are used. However, when an emergency stop of a robot is to be performed, respective axes of the robot being moved are required to be stopped safely. Therefore, there is a case that power is required to be supplied to a servo driver which drives and controls a motor even during a time period of stop operation. For example, when an emergency stop of a robot is to be performed during lifting of one arm of the robot, a speed of the arm being lifted is required to reduce at a predetermined deceleration speed to be zero. In this case, power is supplied to the motor to make the motor perform power running. When power supply to the motor is cut off at a time when a robot is controlled to be decelerated and stopped, the robot may become a so-called free-run state that the robot is not controlled and thus, there is a possibility that the robot becomes a more dangerous state. Therefore, in a case that the techniques described in Patent Literatures 2 through 4 are applied, there is a possibility that a safe stop of a robot is not realized at a time of a power failure and an emergency stop.

SUMMARY

In view of the problem described above, at least an embodiment of the present invention may advantageously provide a discharge circuit and a discharging method for a power supply circuit which is used for driving a motor of an industrial robot, the discharge circuit and the discharging method being capable of safely stopping the robot at a time of a power failure of an external power supply and at a time of an emergency stop of the robot, and capable of decreasing a voltage on a secondary side of the power supply circuit to a safe voltage within a time period specified in the safety standard or the like. Further, at least an embodiment of the present invention may advantageously provide a robot controller comprising the discharge circuit and the power supply circuit.

According to at least an embodiment of the present invention, there may be provided a discharge circuit which is provided for a power supply circuit for a motor configured to drive an industrial robot, and the discharge circuit is configured to discharge a capacitor provided in the power supply circuit. The discharge circuit includes a first voltage detector which detects a voltage inputted to a primary side of the power supply circuit, a second voltage detector which detects a voltage on a secondary side of the power supply circuit, a discharge resistance which is provided in parallel with the power supply circuit on the secondary side of the power supply circuit, a switching element configured to make a current flow or not flow through the discharge resistance, and a power supply control means configured to perform discharge control of controlling the switching element so as to flow an electric current through the discharge resistance. The power supply control means performs the discharge control when a voltage detected by the second voltage detector exceeds a regenerative determination value and, in a case that a voltage on the primary side detected by the first voltage detector becomes lower than a power failure determination value, the power supply control means performs the discharge control after a lapse of a time period required for a stop operation of the industrial robot.

In an industrial robot, at a time of an emergency stop, power supply to a primary side of a power supply circuit is cut off by disconnecting a mechanical contact point. Therefore, at a time of interruption of an external power supply or an emergency stop of the robot, power supply to the primary side of the power supply circuit is cut off and a voltage on the primary side becomes lower than a power failure determination value. In the discharge circuit of the present invention, in a case that a discharge resistance for consuming regenerative energy generated in a motor is provided on a secondary side (output side) of the power supply circuit, the discharge resistance is also used for discharging a smoothing capacitor in the power supply circuit at a time of a power failure of an external power supply, an emergency stop of the robot, and the like. Further, in a case that a power failure of an external power supply or an emergency stop of the robot is detected due to a fact that a voltage on the primary side of the power supply circuit has become lower than a power failure determination value, discharge by the discharge resistance is performed after a lapse of a time period required for a stop operation of the robot. A voltage remains on the secondary side of the power supply circuit during a time period required for a stop operation of the robot and thus, the robot can be safely stopped and, after that, the voltage on the secondary side of the power supply circuit can be decreased to a safe level by discharge through the discharge resistance in a short time, for example, within a time period prescribed in the safety standard.

In the discharge circuit of the present invention, it is preferable that the time period required for the stop operation of the industrial robot is previously stored, for example, as a numerical value. The numerical value having been stored may be determined for each model of the industrial robot. Further, a maximum value of a time period required for a safe stop of the robot during an operation of the robot is previously recognized based on a structure of the robot and its specification and thus, it is preferable that a value which is obtained by adding an appropriate margin to the maximum value is set as the time period required for the stop operation of the industrial robot. When the time period required for the stop operation of the industrial robot is previously stored, a discharge operation can be surely performed at a time of an emergency stop of the robot and a power failure of an external power supply. In a case that a main control means configured to control a motor of each axis of the robot is provided, the power supply control means may be notified of a time period required for a stop operation of the industrial robot from the main control means. When a time period required for a stop operation of the industrial robot is managed on a side of the main control means, a model change of a robot and the like can be further flexibly performed.

In the discharge circuit of the present invention, it may be configured that the power supply control means is notified of completion of the stop operation of the industrial robot from a main control means controlling the motor and, when a notification of the completion is received, the power supply control means determines that the time period required for the stop operation of the industrial robot has elapsed and performs the discharge control. In this case, the discharge control is performed after completion of a stop operation is actually confirmed and thus, the robot can be stopped further surely and safely.

According to at least an embodiment of the present invention, there may be provided a discharging method for discharging a capacitor provided in a power supply circuit for a motor configured to drive an industrial robot. The discharging method includes performing a discharge control of flowing an electric current through a discharge resistance provided in parallel with a secondary side of the power supply circuit when a voltage on the secondary side of the power supply circuit exceeds a regenerative determination value, and also performing the discharge control after a lapse of a time period required for a stop operation of the industrial robot in a case that a voltage on a primary side of the power supply circuit becomes lower than a power failure determination value.

In the discharging method of the present invention, in a case that a discharge resistance for consuming regenerative energy generated in a motor is provided on a secondary side of the power supply circuit, the discharge resistance is also used for discharging a smoothing capacitor in the power supply circuit at a time of a power failure of an external power supply, an emergency stop of the robot, and the like. Further, in a case that a power failure of an external power supply or an emergency stop of the robot is detected, discharge by the discharge resistance is performed after a lapse of a time period required for a stop operation of the robot. A voltage remains on the secondary side of the power supply circuit during a time period required for a stop operation of the robot and thus, the robot can be safely stopped and, after that, the voltage on the secondary side of the power supply circuit can be decreased to a safe level by discharge through the discharge resistance in a short time, for example, within a time period prescribed in the safety standard.

In the discharging method of the present invention, the discharge control may be performed based on a value previously stored as the time period required for the stop operation of the industrial robot. When the time period required for the stop operation of the industrial robot is previously stored, a discharge operation can be further surely performed at a time of an emergency stop of the robot and a power failure of an external power supply. In a case that a main control means configured to control a motor of each axis of the robot is provided, the discharge operation may be performed based on a time period required for a stop operation of the industrial robot which is notified from the main control means. When a time period required for a stop operation of the industrial robot is managed on a side of the main control means, a model change of a robot and the like can be further flexibly performed.

In the discharging method of the present invention, the discharge control may be performed when a notification of completion of the stop operation of the industrial robot is received from a main control means controlling the motor as it is determined that the time period required for the stop operation of the industrial robot has elapsed. In this case, the discharge control is performed after completion of a stop operation is actually confirmed and thus, the robot can be stopped further surely and safely.

According to at least an embodiment of the present invention, there may be provided a robot controller configured to control an industrial robot comprising a motor in each axis. The robot controller includes a power supply circuit having a rectifying circuit and a smoothing capacitor, the power supply circuit outputting DC power from a secondary side based on AC power supplied to a primary side, a first voltage detector which detects an AC voltage inputted to the primary side of the power supply circuit, a second voltage detector which detects a voltage on the secondary side of the power supply circuit, a discharge resistance provided in parallel with the power supply circuit on the secondary side, a switching element configured to make a current flow or not flow through the discharge resistance, a servo controller to which the DC power outputted from the secondary side is supplied to drive and control the motor, a main control means configured to control the motor by outputting a command to the servo controller, and a power supply control means configured to perform a discharge control of controlling the switching element so as to flow an electric current through the discharge resistance. The power supply control means performs the discharge control when a voltage detected by the second voltage detector exceeds a regenerative determination value, and the power supply control means performs the discharge control after a lapse of a time period required for a stop operation of the industrial robot when a voltage on the primary side detected by the first voltage detector becomes lower than a power failure determination value, and the main control means performs processing of making a deceleration stop of the industrial robot when the voltage on the primary side becomes lower than the power failure determination value.

In the robot controller of the present invention, a discharge resistance for consuming regenerative energy generated in a motor is provided on a secondary side of the power supply circuit, and the discharge resistance is also used for discharging a smoothing capacitor in the power supply circuit when supply of AC power to the power supply circuit is cut off due to a power failure of an external power supply, an emergency stop of the robot and the like. Further, in a case that a voltage on a primary side of the power supply circuit becomes lower than a power failure determination value and thereby, cut-off of supply of AC power is detected, the power supply control means performs discharge through the discharge resistance after a lapse of a time period required for a stop operation of the robot. A voltage remains on the secondary side of the power supply circuit during a time period required for a stop operation of the robot and thus, in this time period, the robot can be safely stopped through a deceleration stop processing by the main control means. After that, the voltage on the secondary side of the power supply circuit can be decreased to a safe level by discharge through the discharge resistance in a short time, for example, within a time period prescribed in the safety standard.

In the robot controller of the present invention, it is preferable that the main control means includes a memory in which the time period required for the stop operation of the industrial robot is stored as a discharge delay time, and the main control means is configured to notify the discharge delay time stored in the memory to the power supply control means, and the power supply control means performs the discharge control based on the discharge delay time having been notified. The main control means commonly includes a memory in which various parameters required for control of the robot are stored. Therefore, a time period required for a stop operation of the industrial robot is also stored in the memory as a discharge delay time and, for example, when the discharge delay time is notified to the power supply control means at each time that a robot is connected with the robot controller, the robot controller can be responded to each of various models of robots and a model change of a robot can be also performed flexibly.

In the robot controller of the present invention, it may be configured that the main control means notifies completion of processing of a deceleration stop of the industrial robot to the power supply control means when the processing is completed, and the power supply control means determines that the time period required for the stop operation of the industrial robot has elapsed at a time of being notified and performs the discharge control. In this case, the discharge control is performed after completion of a stop operation is actually confirmed and thus, the robot can be stopped further surely and safely.

In the robot controller of the present invention, it is preferable that an input relay is provided between an external AC power supply and the primary side of the power supply circuit and the input relay is opened at a time of an emergency stop of the industrial robot. According to this configuration, the robot can be further surely stopped at a time of an emergency stop and, in addition, a voltage on the secondary side of the power supply circuit can be further surely set in a safe voltage level within a specified time period at a time of an emergency stop.

[Effects of the Invention]

According to the present invention, the robot can be safely stopped at a time of a power failure of an external power supply and an emergency stop of the robot, and a voltage on the secondary side of the power supply circuit can be decreased to a safe voltage within a time period specified in the safety standard or the like.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Figure 1:
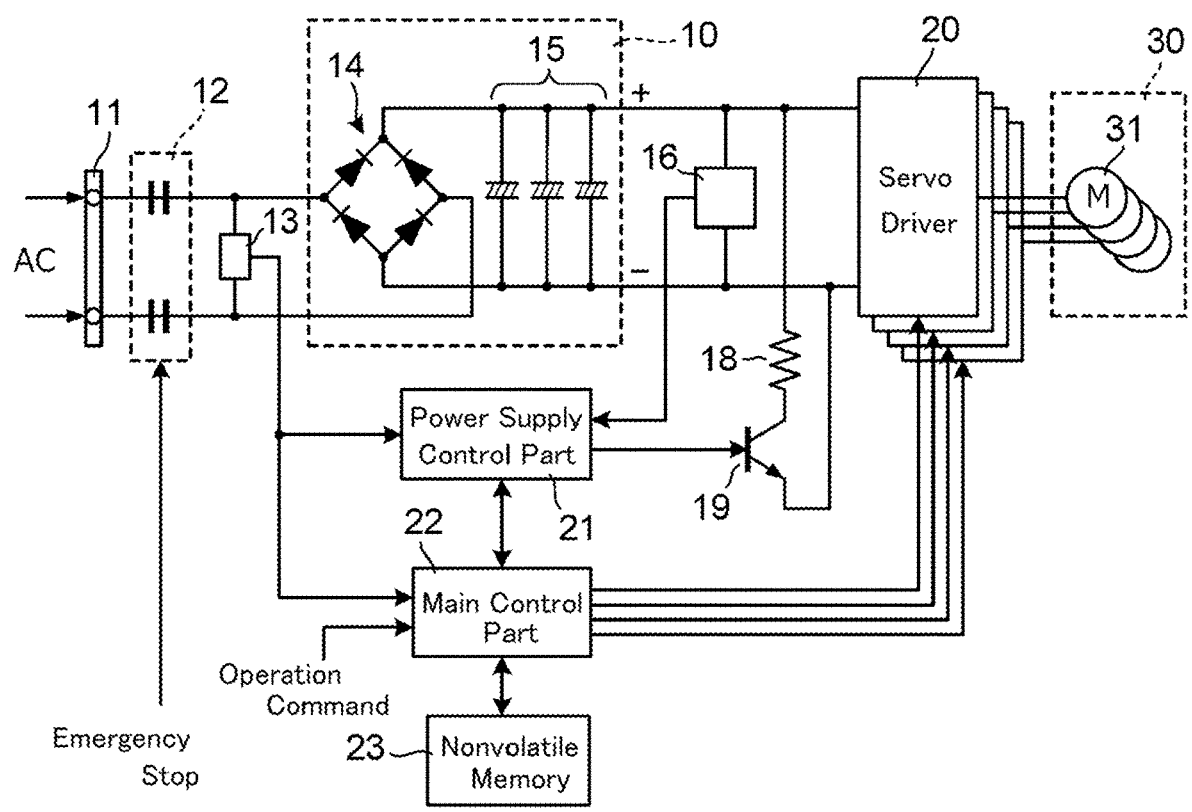
FIG. 1 is a block diagram showing a configuration of a robot controller in accordance with an embodiment of the present invention.

An embodiment of the present invention will be described below with reference to the accompanying drawings. A discharge circuit in accordance with an embodiment of the present invention is preferably used in a robot controller configured to control an industrial robot. FIG. 1 is a block diagram showing a configuration of a robot controller in accordance with an embodiment of the present invention. In the following descriptions, an industrial robot may be simply referred to as a robot.

A robot controller shown in FIG. 1 is used for control of a robot 30 including motors 31 in respective axes, and is connected with an external power supply, for example, a commercial AC power supply having single-phase 200/230V and 50/60 Hz. In the following descriptions, an external power supply is an AC power supply. The robot controller includes a power receiving terminal 11 which receives power from an external power supply, and AC power received by the power receiving terminal 11 is supplied to a primary side of a power supply circuit 10 through an input relay 12. The input relay 12 includes a mechanical contact point and supplies or cuts off AC power from the external power supply to the power supply circuit 10. Especially, the input relay 12 is structured so as to be capable of immediately cutting off AC power supply to the primary side of the power supply circuit 10 when an emergency stop command is inputted.

The power supply circuit 10 includes a full-wave rectifying circuit 14 which rectifies AC power supplied to its primary side and a smoothing capacitor 15 provided on an output side of the full-wave rectifying circuit 14, and the power supply circuit 10 outputs DC power after being smoothed from its secondary side for driving the motors 31 for the respective axes of the robot 30. A primary side of the power supply circuit 10 is provided with an AC voltage detector 13 which detects a voltage of inputted AC power, and a secondary side of the power supply circuit 10 is provided with a DC voltage detector 16 which detects a voltage of outputted DC power. The AC voltage detector 13 and the DC voltage detector 16 respectively correspond to a first voltage detector and a second voltage detector. The DC power which is outputted from the secondary side of the power supply circuit 10 is supplied to servo drivers 20 which are provided so as to correspond to the respective axes of the robot 30. The robot controller is, as described below, provided with a main control part 22, and the servo drivers 20 are controlled by the main control part 22 to drive and servo-control the motors 31 of the corresponding axes of the robot 30. The motor 31 is, for example, structured of a synchronous motor or an induction motor, and the motor 31 generates electromotive force when being decelerated. The servo driver 20 further has a function of outputting a regenerative current based on the electromotive force generated in the motor 31 at a time of deceleration to a side of the power supply circuit 10.

When a regenerative current from the motor 31 is supplied to a side of the power supply circuit 10, a voltage on the secondary side of the power supply circuit 10 rises. When the voltage rises excessively, there is a possibility that the voltage exceeds an allowable maximum input power supply voltage value which is allowed in a device and an element, for example, the servo drivers 20 connected with the power supply circuit 10, and there is further possibility that the voltage exceeds a withstand voltage of the smoothing capacitor 15 of the power supply circuit 10. In order to prevent the problems, a discharge resistance 18 is provided in parallel with the secondary side of the power supply circuit 10 and, in addition, a switching element 19 is provided for making a current flow or not flow through the discharge resistance 18. In the embodiment shown in the drawing, an NPN-type bipolar transistor is used as the switching element 19, and one end of the discharge resistance 18 is connected with a conductor on a positive (+) side which is extended from the secondary side of the power supply circuit 10, and the other end of the discharge resistance 18 is connected with a collector of the transistor which is the switching element 19. An emitter of the transistor is connected with a conductor on a negative (−) side which is extended from the secondary side of the power supply circuit 10. Further, in order to control conduction of the switching element 19, a power supply control part 21 is provided which outputs a signal to a gate of the transistor which is the switching element 19.

When an AC voltage supplied to the primary side of the power supply circuit 10 is 200V, a DC voltage of about 280V is outputted from the secondary side of the power supply circuit 10. When a regenerative current flows from the motor 31, a voltage on the secondary side of the power supply circuit 10 rises and, for example, the voltage may be assumed to exceed 400V. Therefore, the power supply control part 21 monitors the DC voltage on the secondary side of the power supply circuit 10 through the DC voltage detector 16 and outputs a signal to the switching element 19 so as to turn on the switching element 19 when the DC voltage exceeds a regenerative determination value and turn off the switching element 19 when the DC voltage falls below the regenerative determination value. When the switching element 19 is controlled in a conductive state, a regenerative current flows through the discharge resistance 18 and regenerative energy is consumed and thereby, the voltage on the secondary side of the power supply circuit 10 becomes lower. Control in which the switching element 19 is set in a conductive state to make an electric current flow through the discharge resistance 18 is referred to as discharge control. Actually, a hysteresis characteristic is incorporated in control of conduction and cut-off of the switching element 19 and, when the voltage on the secondary side of the power supply circuit 10 exceeds, for example, 400V, the power supply control part 21 turns on the switching element 19 to consume regenerative energy by the discharge resistance 18 and, when the voltage on secondary side of the power supply circuit 10 becomes lower than, for example, 380V through consumption of the regenerative energy, the switching element 19 is set in a cut-off state. As a result, even when a regenerative current exists, the DC voltage on the secondary side of the power supply circuit 10 is maintained to be 400V or lower. The power supply control part 21 is, for example, configured of a CPU (Central Processing Unit), a microprocessor or the like.

In addition, in the robot controller in this embodiment, the power supply control part 21 also performs control of setting the voltage on the secondary side of the power supply circuit 10 within a predetermined safety level within a time period determined by the safety standard at a time of a power failure of an external power supply and an emergency stop of the robot. In the safety standard, as an example, it is determined that the voltage is required to become less than 43V within one minute at a time of cut-off of an external power supply and an emergency stop. The robot controller is provided with an input relay 12 and, when an emergency stop command is inputted to the input relay 12, the input relay 12 is immediately set in an opened state and the voltage on the primary side of the power supply circuit 10 becomes 0V. Of course, even at a time of a power failure of an external power supply, the voltage on the primary side of the power supply circuit 10 becomes 0V. The AC voltage detector 13 always monitors an AC voltage on the primary side of the power supply circuit 10 and thus, when the voltage becomes lower than a predetermined power failure determination value, it is determined that an emergency stop of the robot or a power failure of an external power supply has occurred. In a case that an AC voltage detected by the AC voltage detector 13 falls below the power failure determination value, after a lapse of a time period required for a stop operation of the robot 30, the power supply control part 21 performs discharge control by turning on the switching element 19 regardless of whether a regenerative current is controlled at that time point so as to flow through the discharge resistance 18 for consuming regenerative energy or not. When the time period required for a stop operation of the robot 30 is referred to as a discharge delay time, a conventional control including consumption of regenerative energy is performed as usual until the discharge delay time has elapsed after the AC voltage detected by the AC voltage detector 13 falls below the power failure determination value. As a result, even when supply of AC power from an external power supply is cut off, a residual voltage which is capable of driving the motor 31 is generated on the secondary side of the power supply circuit 10 by an charge having been accumulated in the smoothing capacitor 15 until the discharge delay time elapses after a power failure or an emergency stop is detected. Therefore, when an operation of a deceleration stop of the robot 30 is performed by utilizing the residual voltage, the robot 30 can be stopped safely. After a lapse of the discharge delay time, the power supply control part 21 performs discharge control of turning on the switching element 19 and thereby, a pair of conductors extended from the secondary side of the power supply circuit 10 is connected with each other through the discharge resistance 18. As a result, the charge accumulated in the smoothing capacitor 15 is discharged through the discharge resistance 18, and a voltage on the secondary side of the power supply circuit 10 quickly decreases to 0V depending on a time-constant which is a product of a capacity value of the smoothing capacitor 15 and a resistance value of the resistor 18.

Next, the discharge delay time which is a time period required for a stop operation of the robot 30 will be described below. An operation is considered that the robot 30 is to be decelerated and safely stopped by an emergency stop command when the robot 30 is being operated. A time period required to stop the robot 30 safely is different depending on a size of the robot 30 and according to what kind of an operation is performed. However, a maximum value of a time period required for an operation of being decelerated and stopped safely can be obtained in advance based on configuration and design for each model of the robot. In this embodiment, a value which is obtained by further adding an appropriate safety margin to the maximum value is set as the discharge delay time. In a case of a robot controller which is capable of responding to a plurality of models of robots 30, it is preferable to determine a discharge delay time for each of the models of the robots 30. A time period required for an operation that the robot 30 is decelerated and stopped safely tends to be longer as the robot becomes larger. However, the time period is about several seconds at the most. On the other hand, in the safety standard, it is required that a voltage on the output side of the power supply circuit 10 becomes not more than a so-called safety voltage after a time period of about one minute at a time of an emergency stop. Therefore, even when the discharge delay time is set and a time when discharge of the smoothing capacitor 15 is started is delayed from a timing of an emergency stop for several seconds through about 10 seconds, a problem on the safety standard does not occur.

The discharge delay time can be previously stored in the power supply control part 21. Alternatively, as described below, it may be configured so that a discharge delay time is stored in the main control part 22 and, when the robot 30 is connected with a robot controller or, when the robot controller is activated, the discharge delay time is notified to the power supply control part 21 from the main control part 22.

Next, the main control part 22 of the robot controller in this embodiment will be described below. When an operation command for the robot 30 is given to the main control part 22 from the outside, the main control part 22 outputs to the servo drivers 20 of the respective axes to control the motors 31 of the respective axes for operating the robots 30 based on the operation command. The main control part 22 is configured of a CPU or a microprocessor. The main control part 22 is connected with a nonvolatile memory 23 in which various parameters required to control the robot 30 are stored. The nonvolatile memory 23 may be provided in an inside of the main control part 22 and, in this case, a flash memory incorporated into the CPU or the microprocessor is used as the nonvolatile memory 23. The main control part 22 and the nonvolatile memory 23 configure a main control means. The parameters stored in the nonvolatile memory 23 may include discharge delay times for respective models of the robots 23 and, in this case, the discharge delay time used in the power supply control part 21 is notified to the power supply control part 21 from the main control part 22. Further, a regenerative determination value used in the discharge control for consuming regenerative energy may be also stored in the nonvolatile memory 23 and is notified to the power supply control part 21 from the main control part 22.

In addition, the main control part 22 is configured so that, when an AC voltage detected by the AC voltage detector 13 becomes lower than a power failure determination value, in other words, when it is determined that supply of AC power to the primary side of the power supply circuit 10 is cut off, processing of a deceleration stop of the robot 30 is performed. In FIG. 1, an output of the AC voltage detector 13 is directly supplied to the main control part 22, but the main control part 22 may be notified of that an AC voltage detected by the AC voltage detector 13 has become lower than the power failure determination value from the power supply control part 21.

Figure 2:
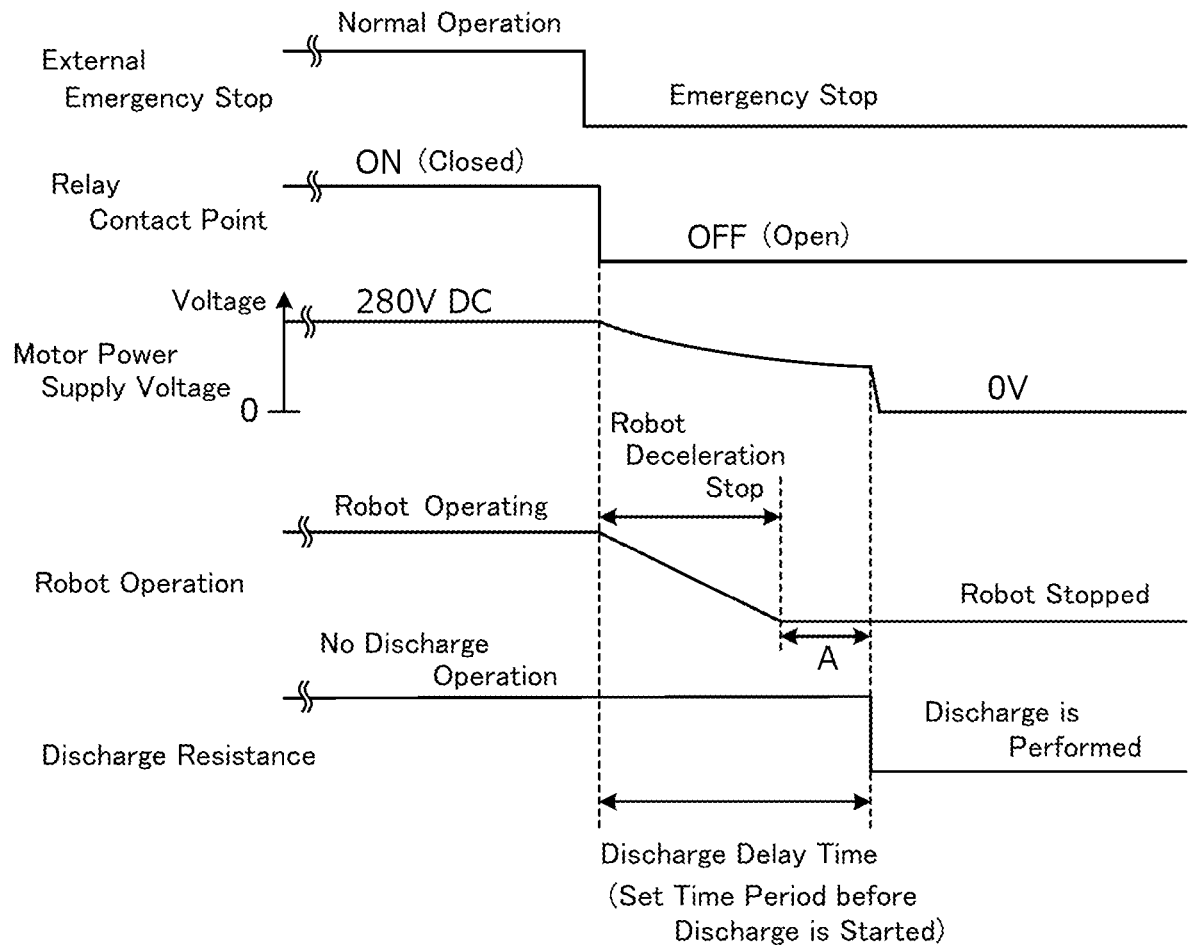
FIG. 2 is an explanatory timing chart showing operations when an emergency stop command is inputted from the outside.

FIG. 2 shows an operation of the robot controller in this embodiment when an emergency stop command is inputted from the outside while the robot 30 is performing a normal operation. In this embodiment, an AC 200V is supplied to the primary side of the power supply circuit 10 and, as a result, it is assumed that a power supply voltage to the motor 31, in other words, a DC voltage on the secondary side of the power supply circuit 10 is 280V. In the drawing, a change of an external emergency stop from a normal operation to an emergency stop means that an emergency stop command has been inputted into the robot controller. When an emergency stop command is inputted, a state of the contact point of the input relay 12 is changed from a closed state (ON) to an open state (OFF) and supply of AC power to the primary side of the power supply circuit 10 is cut off, and the cut-off of the AC power is detected by the AC voltage detector 13. At this point of time, the switching element 19 connected with the discharge resistance 18 is in a cut-off state and thus, the discharge resistance 18 does not perform a discharge operation.

When the cut-off of the AC power supply is detected by the AC voltage detector 13, the main control part 22 performs processing of a deceleration stop of the robot 30 at this timing. In this case, a power supply voltage of the motor 31 is gradually decreased, but is not decreased to a level which causes a trouble in a safe stop of the robot 30. On the other hand, the power supply control part 21 performs discharge control of turning on the switching element 19 after the discharge delay time has elapsed from a timing when the cut-off of the AC power supply is detected by the AC voltage detector 13. An operation of a deceleration stop of the robot 30 has been completed before a lapse of the discharge delay time and, at a time when discharge of the discharge resistance 18 is started, the robot 30 is in a safely stopped state. In FIG. 2, the "A" indicates a margin from a time that the robot 30 has been completely stopped to a start of discharge of the discharge resistance 18. When the discharge resistance 18 starts discharge, a power supply voltage of the motor 31, in other words, a voltage on the secondary side of the power supply circuit 10 becomes 0V quickly.

As described above, in this embodiment, a time period required for a stop operation of the robot 30 is previously set as a discharge delay time and, when the discharge delay time elapses after cut-off of AC power to the primary side of the power supply circuit 10 is detected, discharge is performed by the discharge resistance 18. As a result, while stopping the robot 30 safely, a safety standard regarding a residual voltage on the secondary side of the power supply circuit 10 can be also satisfied. Further, discharge delay times for respective models of robots 30 are stored in the nonvolatile memory 23 as parameters and thus, a model change of the robot 30 connected with the robot controller can be flexibly responded.

In the embodiment described above, a discharge delay time which is a time period required for a stop operation of the robot 30 is previously stored, and the power supply control part 21 performs discharge through the discharge resistance 18 based on the stored discharge delay time when the discharge delay time has elapsed after cut-off of AC power to the primary side of the power supply circuit 10 is detected. However, in the present invention, it can be determined whether a time period required for a stop operation of the robot 30 has elapsed or not without being based on the discharge delay time having been previously set and stored. The main control part 22 actually performs processing of a deceleration stop of the robot 20 and thus, it can be found whether the robot 20 had been completely stopped or not. Therefore, it may be configured that, when processing of a deceleration stop of the robot 30 has been completed, the main control part 22 notifies the completion to the power supply control part 21 and, when the notification is received, the power supply control part 21 determines that the time period required for a stop operation of the robot 30 has elapsed and performs the discharge control. In this configuration, the discharge control is performed after the completion of the stop operation is actually confirmed and thus, the robot 30 can be further surely and safely stopped.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A discharge circuit which is provided for a power supply circuit for a motor configured to drive an industrial robot, the discharge circuit being configured to discharge a capacitor provided in the power supply circuit, the discharge circuit comprising:
   a first voltage detector which detects a voltage inputted to a primary side of the power supply circuit;
   a second voltage detector which detects a voltage on a secondary side of the power supply circuit;
   a discharge resistance which is provided in parallel with the power supply circuit on the secondary side of the power supply circuit;
   a switching element configured to make a current flow or not flow through the discharge resistance; and
   a power supply control means configured to perform a discharge control by controlling the switching element to allow an electric current to flow through the discharge resistance, so as to reduce the voltage on the secondary side of the power supply circuit;
   wherein the power supply control means is configured to perform the discharge control when a voltage detected by the second voltage detector exceeds a regenerative determination value,
   wherein in a case that the voltage inputted to the primary side of the power supply circuit drops below a power failure determination value, the power supply control means is configured to perform the discharge control after a time period required for a stop operation of the industrial robot has elapsed.

2. The discharge circuit according to claim 1, wherein the time period required for the stop operation of the industrial robot is previously stored.

3. The discharge circuit according to claim 1, wherein the power supply control means is notified of the time period required for the stop operation of the industrial robot from a main control means controlling the motor.

4. The discharge circuit according to claim 1, wherein
   the power supply control means is configured to be notified of completion of the stop operation of the industrial robot from a main control means controlling the motor, and
   when a notification of the completion is received, the power supply control means determines that the time period required for the stop operation of the industrial robot has elapsed and performs the discharge control.

5. A discharging method for discharging a capacitor provided in a power supply circuit for a motor configured to drive an industrial robot, the discharging method comprising:
   performing a discharge control by controlling a switching element to allow an electric current to flow through a discharge resistance provided in parallel with a secondary side of the power supply circuit when a voltage on the secondary side of the power supply circuit exceeds a regenerative determination value, so as to reduce the voltage on the secondary side of the power supply circuit; and performing the discharge control after a time period required for a stop operation of the industrial robot has elapsed, in a case that a voltage inputted to a primary side of the power supply circuit drops below a power failure determination value.

6. The discharging method according to claim 5, wherein the discharge control is performed based on a value previously stored as the time period required for the stop operation of the industrial robot.

7. The discharging method according to claim 5, wherein the discharge control is performed based on the time period required for the stop operation of the industrial robot which is notified from a main control means controlling the motor.

8. The discharging method according to claim 5, wherein the discharge control is performed when a notification of completion of the stop operation of the industrial robot is received from a main control means controlling the motor as it is determined that the time period required for the stop operation of the industrial robot has elapsed.

9. A robot controller configured to control an industrial robot comprising a motor in each axis, the robot controller comprising:
   a power supply circuit comprising a rectifying circuit and a smoothing capacitor, the power supply circuit outputting DC power from a secondary side based on AC power supplied to a primary side;
   a first voltage detector which detects an AC voltage inputted to the primary side of the power supply circuit;
   a second voltage detector which detects a voltage on the secondary side of the power supply circuit;
   a discharge resistance provided in parallel with the power supply circuit on the secondary side;
   a switching element configured to make a current flow or not flow through the discharge resistance;
   a servo controller to which the DC power outputted from the secondary side is supplied to drive and control the motor;
   a main control means configured to control the motor by outputting a command to the servo controller; and
   a power supply control means configured to perform a discharge control by controlling the switching element to allow an electric current to flow through the discharge resistance, so as to reduce the voltage on the secondary side of the power supply circuit;
   wherein the power supply control means is configured to perform:
      the discharge control when a voltage detected by the second voltage detector exceeds a regenerative determination value; and
      the discharge control after a time period required for a stop operation of the industrial robot has elapsed, when the voltage inputted to the primary side of the power supply circuit drops below a power failure determination value; and
   wherein the main control means performs processing of making a deceleration stop of the industrial robot when the voltage inputted to the primary side of the power supply circuit drops below the power failure determination value.

10. The robot controller according to claim 9, wherein
   the main control means comprises a memory in which the time period required for the stop operation of the industrial robot is stored as a discharge delay time,
   the main control means is configured to notify the discharge delay time stored in the memory to the power supply control means, and
   the power supply control means performs the discharge control based on the discharge delay time having been notified.

11. The robot controller according to claim 9, wherein
   the main control means notifies completion of processing of a deceleration stop of the industrial robot to the power supply control means when the processing is completed, and
   the power supply control means determines that the time period required for the stop operation of the industrial robot has elapsed at a time of being notified and performs the discharge control.

12. The robot controller according to claim 9, further comprising an input relay provided between an external AC power supply and the primary side of the power supply circuit,
   wherein the input relay is opened at a time of an emergency stop of the industrial robot.

* * * * *